(12) United States Patent
Soghomonian

(10) Patent No.: US 6,466,033 B2
(45) Date of Patent: Oct. 15, 2002

(54) SELF POWERED DSL PORT CONTINUITY CHECKER

(75) Inventor: Armen Soghomonian, Petaluma, CA (US)

(73) Assignee: Nokia Internet Communications Inc., Mountain View, CA (US)

( * ) Notice: Subject to any disclaimer, the term of this patent is extended or adjusted under 35 U.S.C. 154(b) by 0 days.

(21) Appl. No.: 09/753,301

(22) Filed: Dec. 29, 2000

(65) Prior Publication Data

US 2002/0084787 A1 Jul. 4, 2002

(51) Int. Cl.$^7$ ................................................ H04B 3/46
(52) U.S. Cl. ........................................ 324/542; 324/539
(58) Field of Search ................................ 324/542, 539, 324/66; 379/22.02, 22.03, 27.03

(56) References Cited

U.S. PATENT DOCUMENTS

| | | | | |
|---|---|---|---|---|
| 5,187,732 A | * | 2/1993 | Suzuki | 379/22.02 |
| 5,764,725 A | | 6/1998 | Martin | |
| 6,016,058 A | * | 1/2000 | Sussman | 324/66 |
| 6,215,855 B1 | * | 4/2001 | Schneider | 324/527 |

* cited by examiner

Primary Examiner—Christine K. Oda
(74) Attorney, Agent, or Firm—Robert C. Rolnik

(57) ABSTRACT

An apparatus for verifying port and slot assignments of cable bundles that extend from a telephony filtering device, including Digital Subscriber Line (DSL) infrastructure. The apparatus may have a circuit board that inserts into a vacant slot of a frame of DSL equipment. The circuit board (sometimes called a LC circuit board) provides a connector that provides electrical continuity from a voltage driven indicator to, e.g. a slot-to-slot interface. One lead to the indicator may be held to a high voltage by a voltage source. A remaining lead, or probe input, may be connected to a common ground to cause the indicator to illuminate. Frequently, the common ground circuit closure may occur at a Main Distribution Frame (MDF). Such a circuit board may be installed in a data only shelf, i.e. wherein Line Cards (LC) that ordinarily populate the shelf support data traffic that arrives via the slot-to-slot interface. A companion board, or LPF circuit board, may be placed in a slot where a Low Pass Filter (LPF) would ordinarily be located. The LPF circuit board mates to a slot-to-slot interface, providing a conductive link through from the indicator through the slot-to-slot interface and out to a slot-to-MDF interface, wherein an MDF is a main distribution frame suitable for connecting twisted wire pairs to telephony and other equipment. LPF circuit board may provide at least one switch to alternately connect a subscriber line portion of the MDF to the indicator or a PSTN portion of the MDF to the indicator.

7 Claims, 2 Drawing Sheets

SELF POWERED DSL PORT CONTINUITY CHECKER

FIELD OF THE INVENTION

The invention relates to sensing of the identity at least one of multiple cables or wires arriving at a backplane connector of an apparatus designed for (accepting cards/modules for) combining and splitting high frequencies and low frequencies signals to and from a subscriber line, commonly referred to as a twisted pair, and more particularly to responsively providing an indication near the backplane connector that a remote probe has been connected to a common ground at a main distribution frame (MDF).

BACKGROUND OF THE INVENTION

Current voice telephone operators are generally engaging in a growth phase of deploying data services to their subscribers. One of the chief ways to do this is to offer digital subscriber lines (DSL) wherein both voice and data may be carried over a common twisted pair cable to a subscriber's residence or business. The twisted pair then carries two types of duplexed signals over different frequency bands. The first signal is the voice signal, generally at 4 KHz and below. The second signal is the data signal, generally modulated at above 4 KHz.

To add the connection of data, which is generally between an internet service provider (ISP) and the subscriber, a splitting apparatus or low pass filter (LPF) splits the data signals from the voice signals, and routes the data signals through a data link to the ISP. Such a data link may be wired or fiber optic. The additional equipment is sometimes referred to as a Digital Subscriber Line Access Multiplexer (DSLAM). In essence, adding a DSLAM means that the DSLAM must be inserted into the twisted pair circuit between a central office (CO) of the telephone equipment operator, and the premises wiring of the subscriber. The most common place to do that is at a patch panel which may be near a switching office of the operator. Note that the DSLAM does not provide switching of voice signals. The DSLAM combines signals incoming to the subscriber line: high frequency data signals on one hand, and low frequency voice signals on the other hand.

The installation of the DSLAM typically entails breaking the link from twisted pair subscriber line to the switch, and adding two additional connections: 1) from twisted pair subscriber line to the DSLAM, and 2) from DSLAM to the switch. In total, there must be an additional four wires added to the patch panel per addition of data services to a subscriber. The selection of these wires must be done carefully, because the wires from the DSLAM determine the routing of the data to specific ports of the DSLAM. Secondly, the polarity of these wires must observe the tip and ring conventional voltages established by the voice switching industry.

The DSLAM installation is complete when the DSLAM provides output signals corresponding to the now-distinct data channel of the subscriber twisted pair.

A DSLAM rack may have several shelves or racks devoted to the first set of connections, i.e. the four wires that attach to the patch panel for each subscriber installation. At least one shelf is referred to as the low pass filter shelf (LPFS) for the reason that the circuits on the shelf generally filter low frequency signals to be admitted from the subscriber twisted pair to the switch using a low pass filter (LPF) as is known in the art. High frequency signals are passed to other parts of the DSLAM for further processing as data signals.

Each shelf of LPFs may have multiple cable bundles that attach at a backplane that go to the patch panel. In addition, the DSLAM may have at least one shelf devoted to the multiplexing of data signals for ingress into the data network, e.g. the internet. This shelf may have wiring of ports of a line card to a specific LPF of the LPFS. Thus each LPF slot may have a confluence of signals that are purely data (LCS), purely voice (switch) and a combined voice over data signal (subscriber twisted pair).

Identifying the correspondence of bundled wire pairs to a port may be done using conventional means, wherein a technician consults a wiring chart to identify two of 50 bundled wires that correspond to one of a 6 by 8 matrix of ports of the LCS. The wiring chart often refers to the wires by a color coding on the outer insulator of the wires. Such a look-up process may require a technician to hold a reference manual in what is often a crowded central office or other telephony infrastructure enclosure. This is done at a time the technician also separates the needed wires by hand. This has to be done first with one wiring bundle dedicated to the subscriber twisted pair interface, and then next with a second wiring bundle dedicated to the central office twisted pair interface. Sometimes colors, and stripes on the outer insulator can be mistaken for other colors, particularly where 50 wires are concerned. An added difficulty develops because there is a moderate incidence of color blindness in the technician population. This problem is equally applicable where the bundle attaches to the patch panel in a common connector, e.g. 50 conductors in the connector.

A further risk occurs because there is a possibility for a defect to develop in one of several connectors necessary to route signals. For example, from patch panel subscriber twisted pair to patch panel central office twisted pair, there may be as many as 8 connectorized cables. In addition, there may be two cards that are installed to the DSLAM that connect to the backplanes, which make an additional 2 more connections that could be faulty.

Thus it would be helpful to verify the 10 or so interfaces that are added between subscriber line conductor and the interface to the plain old telephone service (POTS) network by performing a continuity check for such circuits. In addition, a means to identify the polarity of tip and ring associated with a LCS port would also be helpful.

SUMMARY OF THE INVENTION

An embodiment may be a circuit board sized to fit inside a vacant slot of a telephony filter, such as a DSLAM. The circuit board may be a height above a bottom edge of the circuit board so that a reciprocal connector engages a backplane communication connector that may provide electrical continuity to a main distribution frame (MDF). The circuit board may provide a positive voltage node above a common ground, wherein the positive voltage node may power an indicator having a probe input. The probe input may be connected to the reciprocal connector so that when a wire having a remote end at the MDF is connected to a common ground, the indicator illuminates.

Another embodiment may be a pair of circuit boards. One is a Line Card (LC) circuit board, which has a connector with a plurality of pins capable of mating to a slot-to-slot interface. The LC circuit board has an indicator having a positive voltage node applied to an indicator such as an LED and a probe input that is connected to a pin of the slot-to-slot interface. A LPF circuit board may mate to part of the slot-to-slot interface via a connector having a plurality of pins. The LPF circuit board may carry a single pole, double throw switch, wherein the single pole is electrically coupled to the probe input. The switch may move the single pole to a first throw to connect a subscriber conductor of the MDF. The switch may be moved to the second throw position to be connected to the central office (CO) conductor of the MDF.

Yet another embodiment may be an indicator having a positive voltage node and a probe input, wherein the probe input is connectable to the conductor of the line card connector (backplane). Any coupling of the probe input to ground causes the indicator to light up.

The use of one or more of the embodiments of the invention may enable a determination of completed cabling and accurately identify an identity of a wire or probe at a remote end to a DSLAM or other filtering apparatus. Such a wire or probe may be positively identified as connecting to a particular slot and particular port of a rack of equipment.

One or more of the embodiments may permit a selection of which type of cable an indicator should sense connection to, i.e. cables directed to a subscriber's twisted pair, and theoretically able to transport voice and data signals. Alternatively, selection may be made to sense connection of cables directed to a publicly switched public network (PSTN), which may theoretically be filtered to carry only voice signals.

One or more of the embodiments is arranged to be portable, and suited to mate with connectors that may be part of a slot-to-slot interface such that the embodiment may be easily installed and removed from a interface that is under test. Such a configuration may aid rapid testing of many similarly shaped slot and slot-to-slot interfaces that have substantially the same type of connectors. Such testing made in advance of installing Low Pass Filter (LPF) and Line Cards (LC) may improve the speed with which a circuit of a DSLAM is inserted into the path between the PSTN and the subscriber line. In addition, technicians making such installations may break the link between subscriber line and PSTN for a briefer time than absent use of an embodiment.

DETAILED DESCRIPTION OF THE PREFERRED EMBODIMENTS

Figure 1:
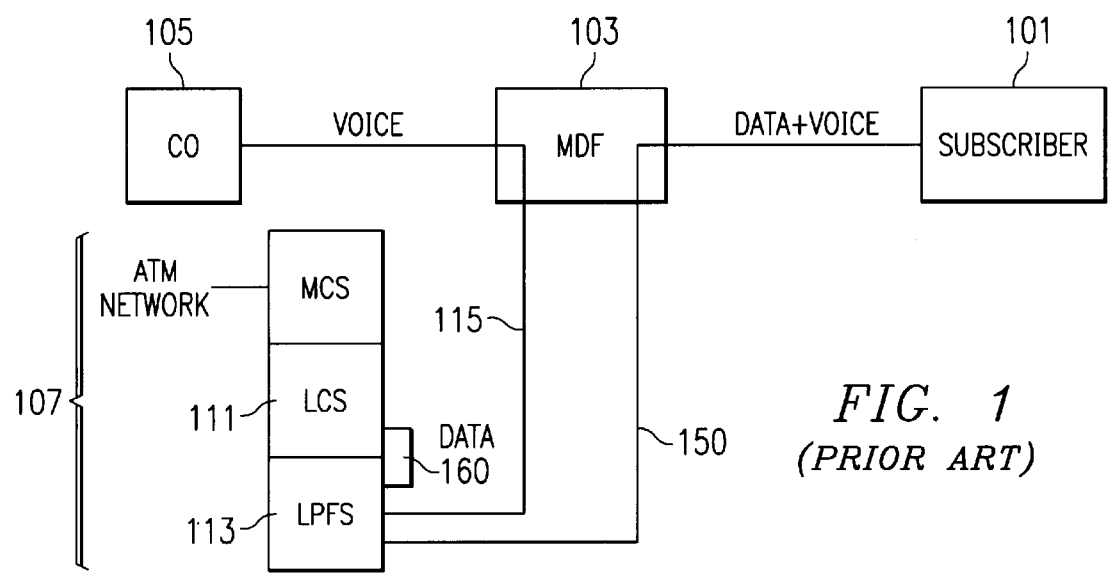
FIG. 1 shows a prior art Digital Subscriber Line Access Multiplexer (DSLAM) configured to provide signals to a Main Distribution Frame (MDF) among others.

FIG. 1 shows a type of Digital Subscriber Line Access Multiplexer (DSLAM) 107, which includes a line card shelf (LCS) 111 and a low pass filter shelf (LPFS) 113. Main distribution frame (MDF) or patch panel 103 is where each wire between a subscriber 101 and a central office 105 are connected. A technician installing the DSLAM to a subscriber must connect a wire pair of the voice over data bundle 150 using a short pair of wires or jumpers at the MDF 103. Then a wire pair of the voice only bundle 115 must be connected to the MDF 103. Both the voice only bundle 115 and the voice over data (VOD) bundle 150 may end in a connector of about 50 conductors at the MDF 103.

There may be a data only cable bundle 160 between the LCS 111 and the LPFS 113. The combined LCS 111, cable bundle 160 and LPFS 113, may form a slot-to-slot interface. More generally, a slot-to-slot interface includes any combination of conductors and connectors that transport a signal from one cavity in a rack to another cavity in a rack, wherein the cavity provides support for at least one circuit board and the connectors provide a mating electrical interface for a at least one circuit board inserted into each of the cavities. An embodiment of the invention may verify these connections.

Figure 2:
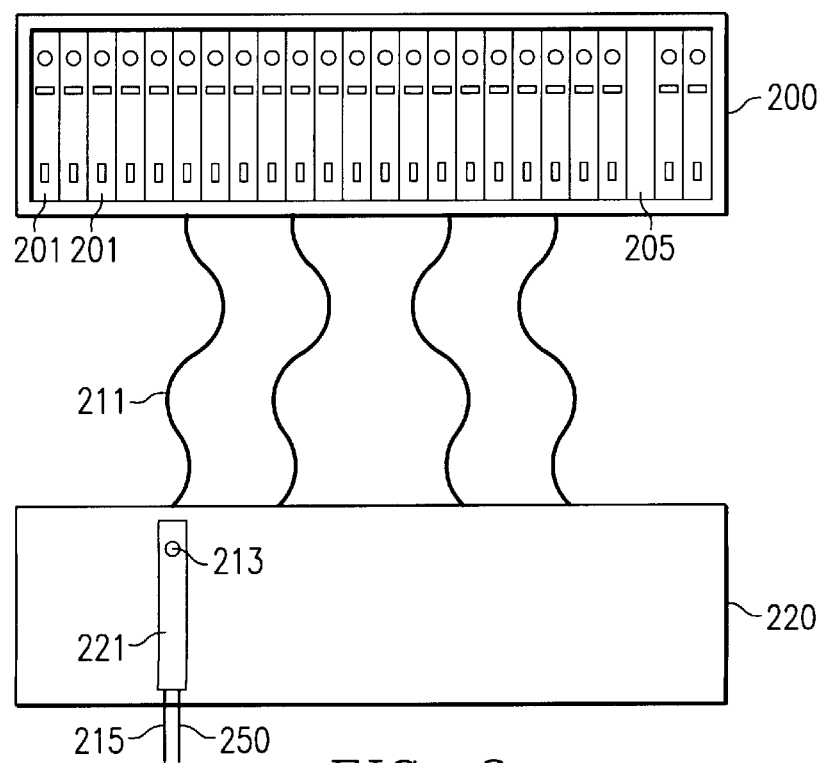
FIG. 2 shows a view of the Line Card Shelf (LCS)

FIG. 2 shows a view of the LCS 200. The LCS has card slots 201, which may be cavities in a rack, wherein at least one is open 205. Each set of card slots may be grouped by six such that six card slots are handled by a single set of bundled cables. Each card slot may support up to eight ports, wherein each port has two wires associated with it. One or more ports may be carried in a LPFS-LCS cable 211 or by other means known in the art to connect to signals appearing at a backplane or other connectors.

A sensor board or PAM may be installed to the open slot 205. The PAM may provide an indicator, e.g. a LED, in a circuit with at least one wire associated with a port. A pair of LEDs in a single package, the so-called bipolar LED, may provide a lead for each cathode of each LED to a separate wire such that collectively, the LEDs operate to indicate the status of a pair of wires. Such a pair of wires may be data wires as part of the data bundle 160 that connects to the LPFS 220. A MDF cable bypass 221, or CAM may be installed in an open LPFS slot or cavity that, absent LPFS-LCS cable 211 faults, provides circuit access to and through the MDF cable bypass 221. Because the MDF cable bypass 221 may take the place of at least one LPF (which is about to be installed) the MDF cable bypass 221 may provide connectivity of the circuit to either the VOD bundle 250 or the voice only bundle 215. MDF cable bypass 221 may have a circuit board that may support an edge mounted switch 213 that in alternate positions connects at least one wire of the data port to the VOD bundle 250 or to the voice only bundle 215. Such a switch may be hand actuated, or operate by other controls. Since in many cases a LPF will support several subscriber lines, a technician may test several wires leaving the LPFS 220 for continuity to the LCS 200 without the need to remove the CAM.

Figure 3:
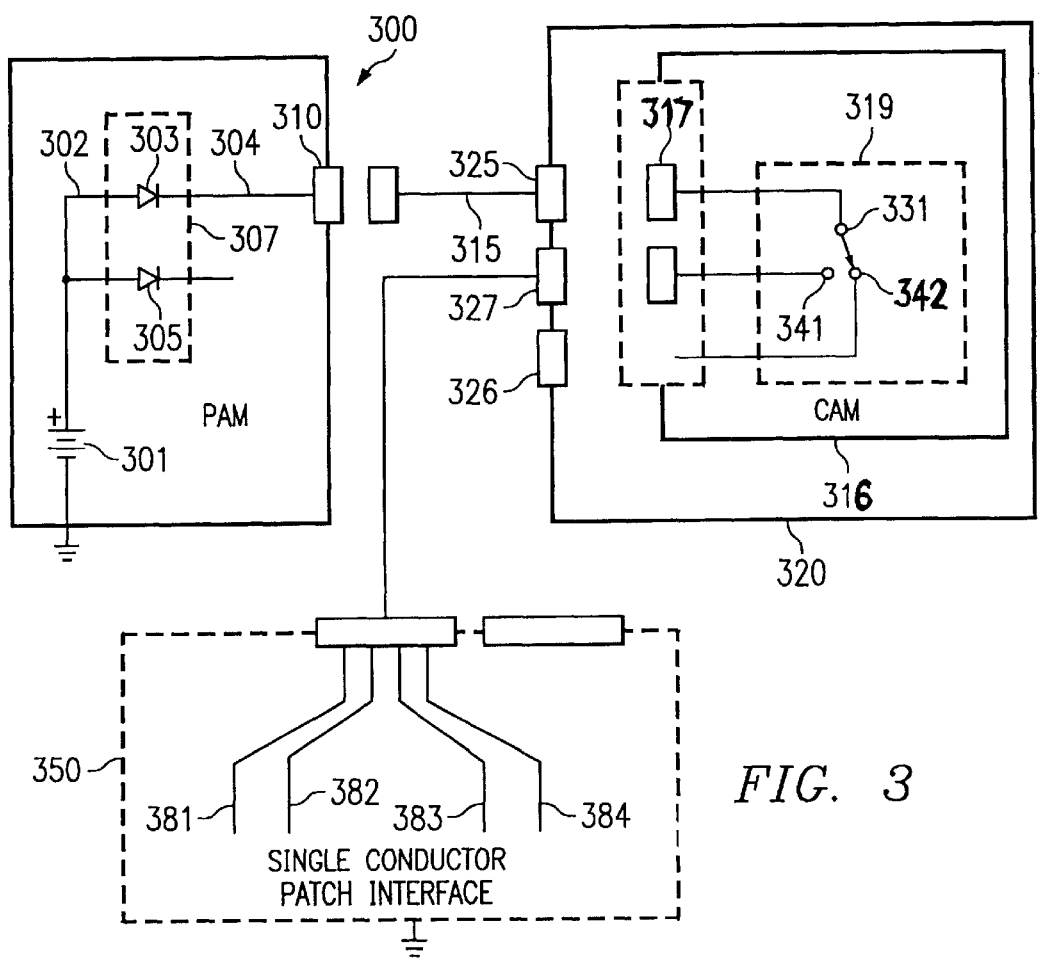
FIG. 3 shows a sensor board embodiment and the attendant routing of one cable through the Low Pass Filter Shelf (LPFS)

FIG. 3 shows a sensor board 300 embodiment and the attendant routing of one cable through the Low Pass Filter Shelf 320. The supporting structure of the sensor board 300 is a line card circuit board or LC circuit board, which may be a substrate for circuits as is known in the art. Sensor board 300 may include a voltage source 301, which may be used to provide a direct current bias to a first indicator 303, which may be enclosed in a common package 307 with a second indicator 305. First indicator may provide a red color when cathode or probe input 304 is brought to a ground voltage. First indicator 303 may be connected to a pin or conductor of a line card connector 310 for carrying voice signals and possibly data signals. Generally, the line card connector has many pins that may engage a reciprocal connector. The line card connector 310 may also include a conductor having a voltage from the DSLAM that is sufficiently high to provide a signal of continuity when applied to (anode of) the first indicator 303 in lieu of the voltage source 301. That is, the line card connector may provide a positive voltage at anode or positive voltage node 302. Second indicator 305 may provide a green color when its cathode is brought to a ground voltage. In the absence of a voltage source from the line card connector, a battery 301 may be used instead.

The first indicator and the second indicator may be mounted on an exterior edge of a printed circuit card that extends from the recesses of the LCS to a location more visible to a technician. A suitable form factor for such a printed circuit card may be similar in size to a line card. Each package may have attendant markings nearby, or other indicia to indicate the port number to which the indicator relates.

The sensor board 300 provides a continuity check of a configuration of line card shelf, LPF shelf and patch panel. Connectivity may be checked at any intermediate point by touching the conductor under test to ground, however, it may be best to perform such a test at the patch panel 350.

The individualized conductor posts or connectors of the patch panel 381, 382, 383 and 384 may each be connected to a local ground at the patch panel or MDF 350. The illumination of the first indicator 303 will be the result upon connecting to ground of the conductor post 381 provided there are good electrical connections at all connectors upstream of the patch panel. Such an illumination may designate a polarity of the conductor post 381 as corresponding to a tip. Similarly, good connectivity between a second indicator 305 may cause illumination when conductor post 382 is connected to ground. Such an illumination may designate a second polarity of the conductor post 382 as corresponding to a ring.

The MDF cable bypass 316 sometimes called the LPF circuit board may provide a simple bridge between each conductor of the LPF back-plane to the LPF card connector 325 and the LPF card to LPF back-plane subscriber connector 327. The MDF cable bypass may be supported by a circuit board material, as is known in the art. A more sophisticated embodiment of the MDF cable bypass 319 may include a switch that switches a conductor of the LPF back-plane to LPF card connector 325 to one of.

LPF card to LPF back-plane subscriber connector 327; and

LPF card to LPF back-plane CO connector 326.

Such a switch 319 may be single pole, double throw (SPDT) switch, which has a pole 331 which is continuously in contact with the slot-to-slot interface 315 when in contact with the equipment to be tested. The LPF card to LPF backplane subscriber connector 327 connects to the MDF 350 via a conductor that may, in part, be a wire in a cable assembly. For a technician to properly install a LPF card for immediate service to a subscriber, this conductor must be connected to the twisted pair of wires that connects to the subscriber's home or office telephone wiring. The LPF card to LPF backplane subscriber connector 327, together with any cable that carries at least one conductor to the MDF is referred to as the slot-to-MDF interface. The slot end of the slot-to-MDF interface is the end of the conductor that appears in the LPF back-plane subscriber connector 327. There may be a separate connector on the equipment to be tested. The connector may be a LPF back-plane PSTN connector 326, which provides a connection to the PSTN. In embodiments having a switch 319, a first throw 341 of the switch may connect to a conductor of a subscriber on the LPF back-plane subscriber connector 327. A second throw 342 of the switch 319 may connect to a conductor of the PSTN on the LPF back-plane PSTN connector 326. It is possible that the equipment under test would have a single package having multiple pins that operates as a connector to both the PSTN and to the subscriber line. In which case each throw of the switch would be routed through such a connector, but to the subscriber line on one hand, and the PSTN on the other.

The MDF cable bypass 316 provides a pin 317 or a conductor end that may provide an electrical connection to the slot-to-slot interface 315. Such an electrical connection may, as mentioned, be accomplished through a switch of some sort. The slot-to-slot interface may connect to a backplane. The slot-to-slot interface 315 includes any connector that is a reciprocal connector to a line card. The sensor card 300 embodiment may have a connector 310 that may be sized to be different than a connector of the line card, but the connector 310 must be sized and have at least one pin configured to mate with the slot-to-slot interface 315 for good electrical contact.

Figure 4:
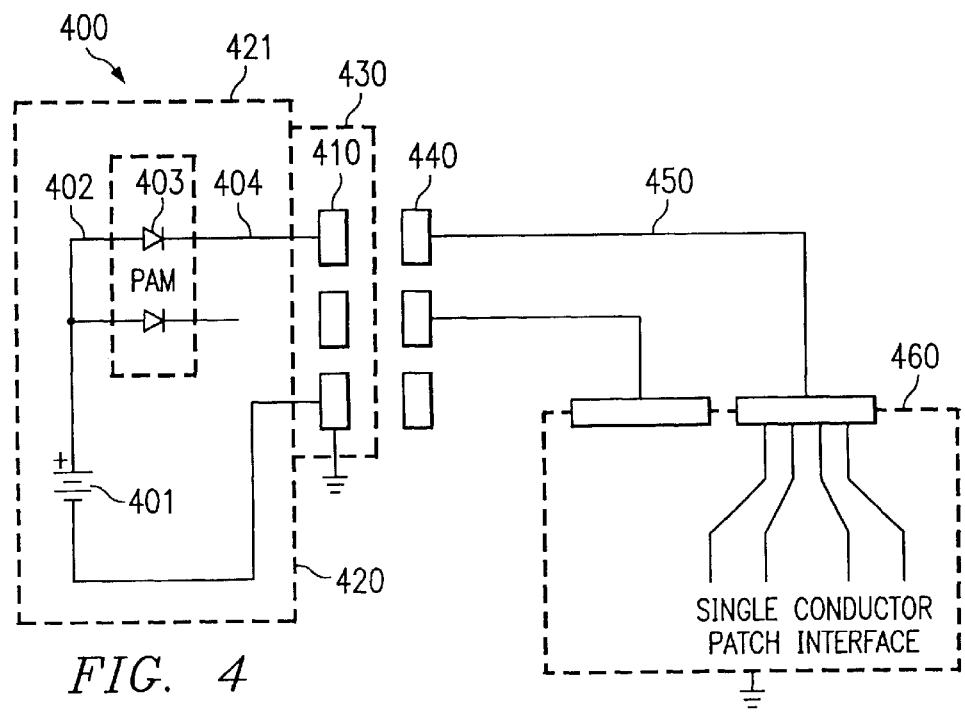
FIG. 4 shows a second embodiment for use with DSLAMs having common low pass filter and line card functionality in a single shelf.

FIG. 4 shows a second embodiment of the invention for DSL equipment wherein the low pass filter and line card functionality is placed on a common circuit board 400 for use on a common slot of a shelf. The second version of the DSL equipment uses a single shelf to obtain data only signals from a DSL subscriber line. Thus conductors that are dedicated to a single subscriber need only be made in cables that extend to the MDF. Nevertheless, there continues to be a need to verify that cable, among other connections. The embodiment then may be placed on a shelf which may have two rails to assist in aligning and supporting the LC/LPF. Such a shelf has a shield, or rails, or other apparatus that is a ceiling. Such a ceiling is located a distance from a rail located at a bottom of the shelf. A slot-to-MDF interface exists in that the backplane to the shelf has at least one backplane communication connector 440 plus a cabling 450 to a MDF 460. The terminals on the MDF 460 are the remote ends of the slot-to-MDF interface, and may include short cables that may connect two terminals together, otherwise known as jumpers.

The embodiment is organized around and may include a circuit board 400. The circuit board 400 has a bottom edge 420 and a top edge 421, which are separated by a width. The bottom edge may have a thickness sufficiently thin to be accepted into a rail, the rail forming a part of the cavity. To seat into a backplane communication connector 440, the embodiment may have a reciprocal connector 430. The reciprocal connector 430 may have contacts, which engage contacts of the backplane communication connector (BCC) such that if the BCC 440 has a male part, there may be a corresponding female contact in the reciprocal connector 430. Similarly, any outer shell or hood that may partially enclose BCC 440 may have a compatible member in reciprocal connector 430 that either surrounds the BCC 440 or inserts within BCC 440 for a firm fit. Reciprocal connectors come in many shapes and sizes to correspond with the many connectors that may be used as a BCC 440. The absence of a one-to-one correspondence of contacts between BCC and reciprocal connector 430 does not diminish the identity of the connector as a reciprocal connector 430. To properly mate the reciprocal connector 430 to the BCC 440, the reciprocal connector 430 may be a height above the bottom edge 420. The reciprocal connector 430 may be soldered to the printed circuit board 400 and so may not be directly above the bottom edge, but it must be higher than the bottom edge.

A LC/LPF may support eight ports, and consequently, eight line pairs to the central office MDF connectors and their associated eight line pairs to the subscriber MDF connectors. Thus, a port continuity checker of the second embodiment may be used to test out four conductors for each subscriber: two to the CO and two to the subscriber's premises wiring. At least one indicator has a positive voltage node 402, which may be held high by a voltage source 401, which may be a battery. A probe input 404 may be coupled to the reciprocal connector 430, e.g. by a conductive trace on the printed circuit board 400. The indicator 403 may be one of several LEDs enclosed in a common package and radiating different colored outputs, e.g. red or green. The indicator 403 may be mounted at a circuit board edge remote from the BCC 430. Such a location may improve visibility of the indicator 403.

Although the invention has been described in the context of particular embodiments, various alternative embodiments are possible. Thus, while the invention has been particularly shown and described with respect to specific embodiments thereof, it will be understood by those skilled in the art that changes in form and configuration may be made therein without departing from the scope and spirit of the invention.

What is claimed is:

1. An apparatus for verifying circuit completion between a conductor of a line card connector and a patch panel conductor, wherein the conductor of the line card connector has a MDF cable bypass that bridges the conductor of the line card connector to the patch panel conductor at a LPF connector comprising:

at least one indicator having a positive voltage node and a probe input, wherein the probe input is connectable to the conductor of the line card connector and coupling the probe input to ground causes the at least one indicator to indicate.

2. The apparatus of claim 1 further comprising:

a common package housing that surrounds the first indicator having a first color and a second indicator having a second color, wherein the first indicator and the second indicator are two indicators of the at least one indicator.

3. The apparatus of claim 1, wherein the conductor of the line card connector is placed on a backplane in alignment with a slot having at least one rail for receiving a line card, the apparatus further comprising:

a connector having a plurality of pins, wherein at least one of said pins is connected to the probe input; and a circuit board supporting said connector for connecting with the line card connector wherein said circuit board is placed on at least one rail.

4. An apparatus for verifying circuit completion between a slot-to-slot interface having a remote end and an intermediate end, and a slot-to-MDF interface having a slot end and a remote end comprising:

a LC circuit board having a connector with a plurality of pins for matingly engaging the slot-to-slot interface;

at least one indicator having a positive voltage node and a probe input, wherein the probe input is connected to a pin of the plurality of pins;

a LPF circuit board having a connector with a plurality of pins for matingly engaging the slot-to-MDF interface and engaging the slot-to-slot interface intermediate end;

at least one switch supported by the LPF circuit board, the at least one switch having a pole electrically connected with the probe input when the LPF circuit board is engaged with the slot-to-slot interface;

a first throw electrically connected with a CO conductor of the remote end of the slot-to-MDF; and a second throw electrically connected with subscriber conductor of the remote end of the slot-to-MDF, wherein the at least one switch may be moved to connect the pole with the first throw when the at least one switch is in a first position and the pole with second throw when the at least one switch is in a second position.

5. An apparatus for verifying electrical continuity of at least one backplane communication connector and cabling to a MDF, wherein said at least one backplane communication connector is displaced a height above an at least one rail for support of a daughterboard and a ceiling supported a distance above the rail, wherein said at least one backplane communication connector includes a conductor connected to ground, said apparatus comprising:

a circuit board having a bottom edge and a width;

a reciprocal connector supported by the circuit board the height from the bottom edge, wherein said reciprocal connector may matingly engage the at least one backplane communication connector;

at least one indicator having a positive voltage node and a probe input, wherein the probe input is supported on the circuit board and coupled to the reciprocal connector.

6. The apparatus of claim 5 wherein the width is substantially the same as the distance.

7. The apparatus of claim 5 wherein the circuit board comprises a remote circuit board edge that is remote from reciprocal connector and the circuit board supports the indicator near the remote circuit board edge.

* * * * *